June 24, 1958  R. A. CHAPELLIER  2,840,398
AUTOMATIC COUPLING OR LATCHING MECHANISM
Filed May 2, 1956  3 Sheets-Sheet 1
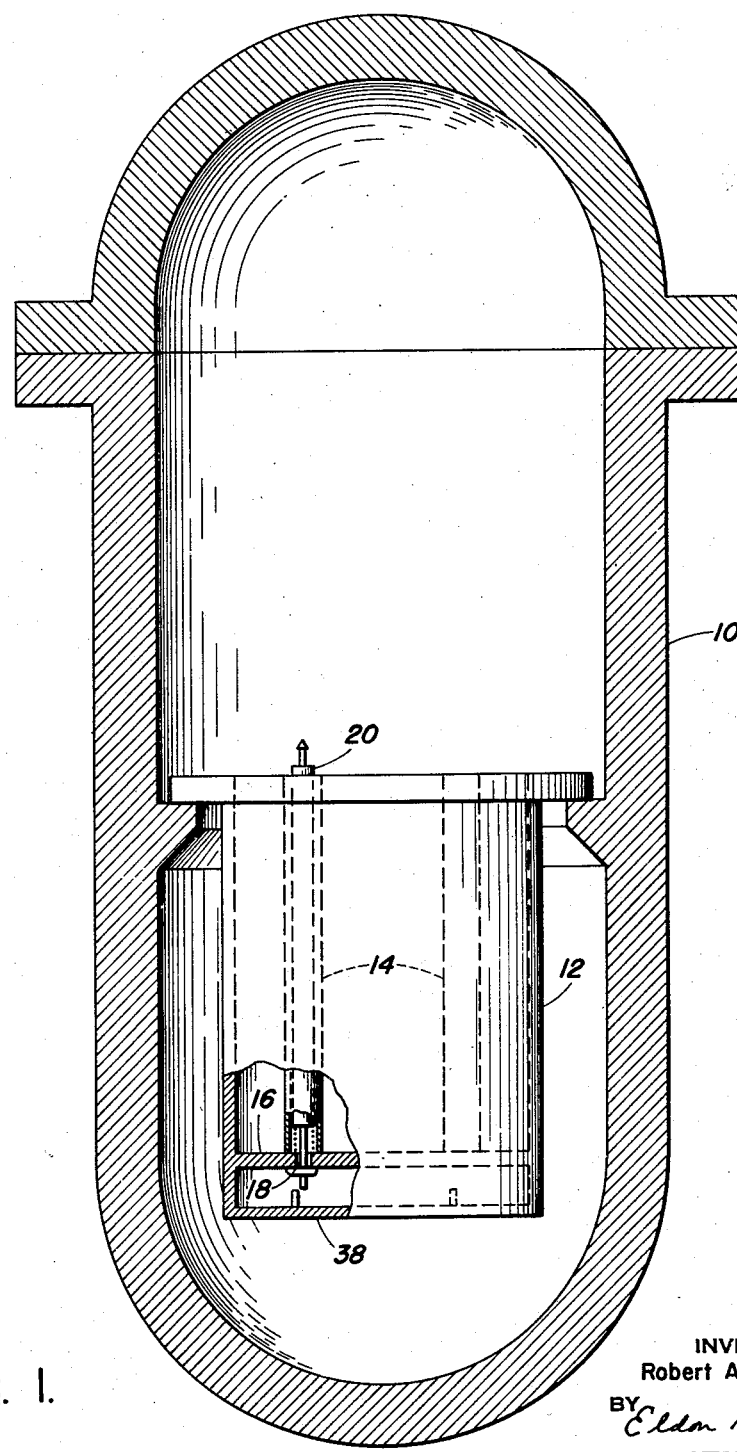
Fig. I.
INVENTOR
Robert A. Chapellier
BY *Eldon H. Luther*
ATTORNEY

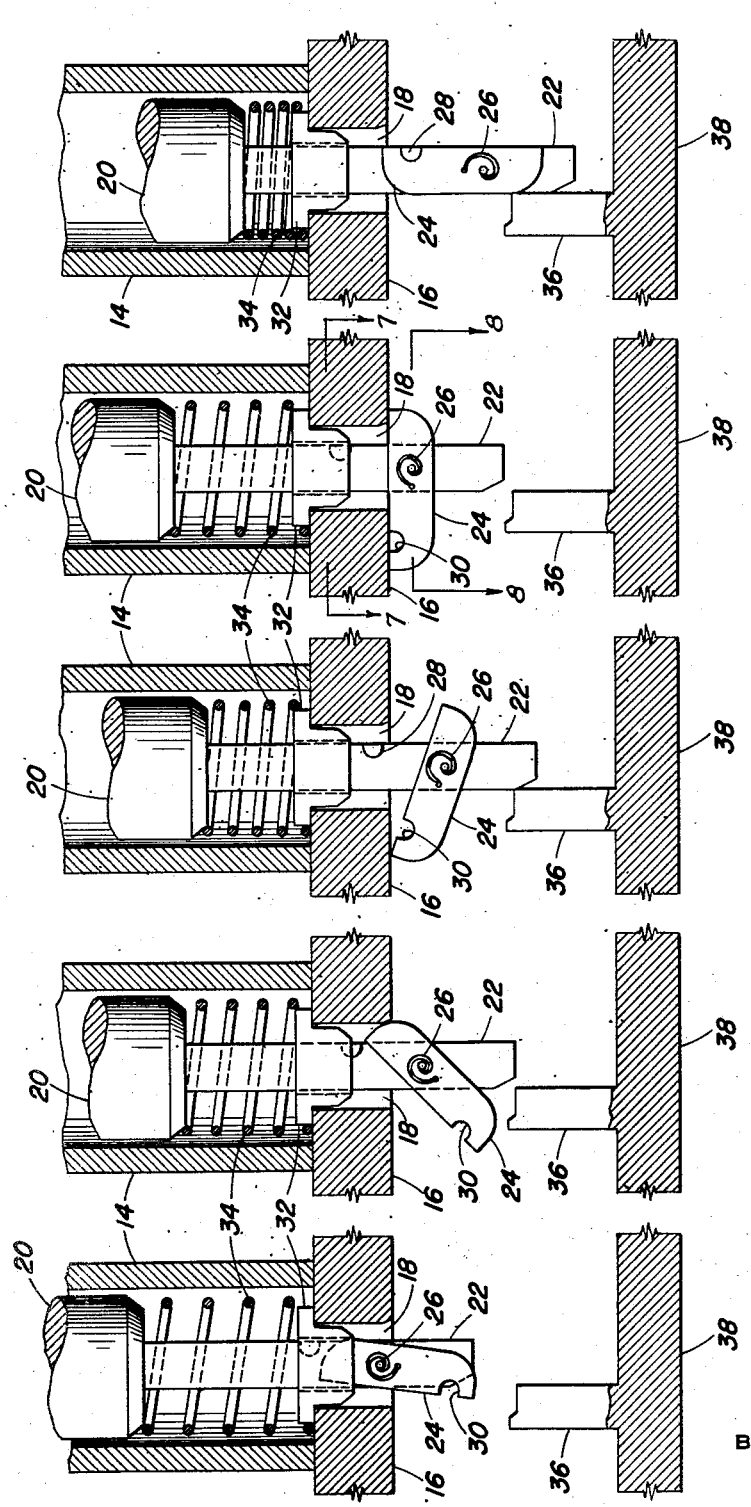

June 24, 1958  R. A. CHAPELLIER  2,840,398
AUTOMATIC COUPLING OR LATCHING MECHANISM
Filed May 2, 1956  3 Sheets-Sheet 3
Fig. 7.
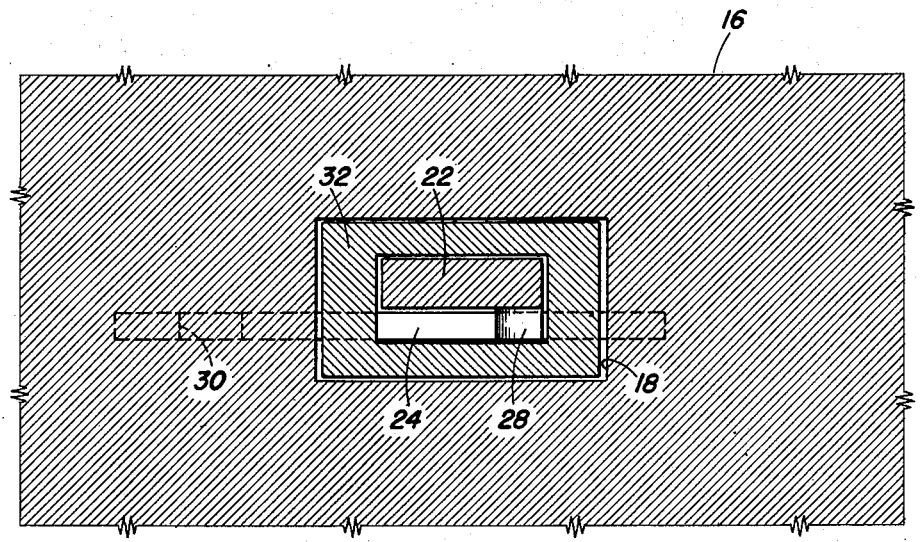
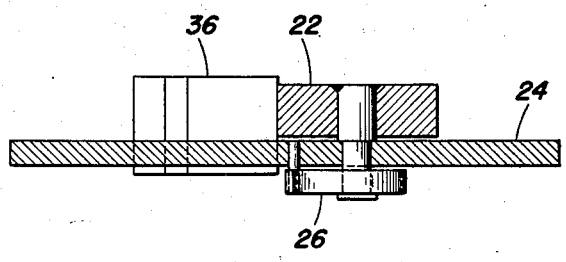
Fig. 8.
INVENTOR
Robert A. Chapellier
BY
ATTORNEY

United States Patent Office 2,840,398
Patented June 24, 1958

2,840,398

AUTOMATIC COUPLING OR LATCHING MECHANISM

Robert A. Chapellier, Whitestone, N. Y., assignor to Combustion Engineering, Inc., New York, N. Y., a corporation of Delaware Application May 2, 1956, Serial No. 582,103

7 Claims. (Cl. 287—20.5)

This invention relates to coupling or latching devices for releasably retaining two separate members in predetermined relation with each other and has relation to such devices wherein the latching or unlatching action is obtained by unidirectional movement of any of these members relative to each other.

At times it is necessary to obtain a coupling and uncoupling action between two members with the coupling and uncoupling being accomplished solely by unidirectional relative movement of the members. Such a coupling action is required in certain industrial processes that take place within a pressure vessel wherein it is necessary to position and retain structural elements within the vessel at certain locations with accessibility being extremely difficult so that the coupling action must be automatically obtained by mere insertion of the elements in place. For the purpose of explanation the invention will be described in such an environment although it is to be understood that this is by way of explanation only, for the invention may obviously be used in other and different environments.

In accordance with the present invention there is provided a housing or body member, such as may be retained in a suitable pressure vessel to form a frame to support structural elements within the vessel, with the housing having a suitable opening provided therein. Insertable within this opening is a shank or stem which is adapted to be connected at its upper end to a structural member as desired. Pivotally mounted upon this stem or shank is a locking lever with the pivotal axis of the lever being generally normal to the axis of the shank and lying well in from the two ends of the lever. The length of this locking lever is substantially greater than the diameter of the opening in the body member so that when the lever is positioned transversely of the shank it will not pass through this opening but will bridge the same and engage the end wall of the body member adjacent the opening. This locking lever is urged by a suitable spring for rotation about its pivotal axis into engagement with a suitable stop that is provided on the shank, the lever being generally parallel or in alignment with the shank when in engagement with this stop so that the shank together with the lever may be freely moved through the opening when the lever is in this position. Slidably mounted on the shank at a location about the pivotal connection of the lever is a retaining member which may be manually positioned to retain the locking lever in a position substantially 180° from the position it occupies when engaging the stop and in which position it is also generally parallel and in alignment with the shank. In operation, the latch and this retaining member are manually set so that the retaining member holds the latch 180° from the stop position. The shank is then moved axially downward through the opening in the body member against the force of a spring that is provided to urge the shank in an upward direction. Upon downward movement of the shank through the opening, the retaining member contacts the body member and slides along the shank releasing the locking lever. The spring that urges the locking lever about its pivotal axis causes the lever to rotate toward the stop, but when the lever has been inserted only a short distance through the opening the lever is prevented from moving this entire distance by engaging the frame, the lever then being generally transverse of the shank and bridging the opening so as to prevent withdrawal of the shank from the opening, and the spring that urges the shank in an upward direction causing the lever to engage and be parallel with the lower surface of the body member. However, upon moving the lever and shank downward a further predetermined distance the lever may rotate about its pivotal axis into engagement with the stop member whereupon the shank may be freely removed from the opening and in order that assurance may be had that the pivotal lever will move to this latter position, where it is in effect in its unlatched position, an abutment or the like, is provided in a position to contact the locking lever and, if necessary, positively rotate it into engagement with the stop in response to this further movement of the shank.

It is an object of this invention to provide an improved coupling or latching mechanism for releasably coupling two members together with the operation of the coupling being had solely through relative unidirectional movement of these members.

Other and further objects of the invention will become apparent to those skilled in the art as the description proceeds.

With the afore-mentioned objects in view, the invention comprises an arrangement, construction and combination of the elements of the inventive organization in such a manner as to attain the results desired as hereinafter more particularly set forth in the following detailed description of an illustrative embodiment, said embodiment being shown by the accompanying drawing wherein:

Fig. 1 is a diagrammatic illustration in the form of a vertical section of a pressure vessel within which a suitable process is to take place and showing vertically movable members retained within a suitable frame in the vessel.

Figs. 2 through 6 are detailed vertical sectional views of the coupling or latching mechanism of the present invention showing the elements thereof in the respective positions they occupy during progression of the latching and unlatching operation. Fig. 7 is a sectional view taken along line 7—7 of Fig. 5; and Fig. 8 is a sectional view taken along line 8—8 of Fig. 5.

Referring now to the drawing, wherein like reference characters are used throughout to designate like elements, there is shown therein a vessel 10 such as may be provided for any desirable reaction to be conducted under high pressure and within which is provided a containment or frame member 12. This containment member includes a number of vertically disposed sleeves 14 which are secured to a plate 16 near the lower end of member 12, openings or bores 18 being provided in this plate in coaxial relation with the sleeves. Extending into each of these sleeves is an element 20, as for example, catalyzers for a process, which are adapted to be moved in and out of these sleeves by mechanism that may be connected to the upper end of these members. In order that the elements 20 may be positively retained in the frame members 12 after being lowered into place therewithin and still easily removed from this frame member by this actuating mechanism when desired a latch or coupling is provided at the lower end of these elements and which is actuated merely by vertical movement of the element relative to the frame member.

As embodied, this latch or coupling includes a shank or stem 22 that is coaxial with and extends downward from the element 20.

Pivotally mounted adjacent the lower end of this shank is a locking lever 24, the pivotal axis of this lever being generally normal to the axis of the shank. This lever is urged in a clockwise direction as viewed in Figs. 2–6 by a spring 26, and a stop 28 limits the rotation of the lever, this stop being secured to shank 22 and received within a recess 30 provided in the lever, when the lever has moved to its extreme position in engagement with the stop as shown in Fig. 6. When in this position the locking lever is in alignment with or in parallel relation to the shank 22, thus permitting the shank to freely pass through the opening 18.

Slidably received upon the shank 22 is a retaining member 32 which is employed to retain the locking lever 24 in its initial position against the bias of the spring 26, the lever having been rotated to this initial position substantially 180° from the position it occupied when in engagement with the stop 28 (see Fig. 6), Fig. 2 showing the elements of the latching mechanism in this initial position, the retaining member 32 being positioned down over the end of the lever. For a purpose that will later become apparent, a coil spring 34 is provided at the lower end of the sleeve 14 so as to be engaged by the element 20 and so as to oppose the downward movement of the element together with the shank 22.

In operation, the locking lever 24 and the retaining member 32 are manually set in the relative positions they occupy in Fig. 2, with the retaining member preventing the spring 26 from rotating the lever. The element 20 is then lowered into the sleeve 14 until shank 22 extends through the opening 18 and the lower end of the element engages the spring 34. After the shank 22 has been lowered a predetermined distance through the opening 18 the retaining member 32 contacts the upper surface of plate 16 so that further downward movement of the shank releases the lever 30 from the retaining member as shown in Fig. 3, thus permitting the spring 26 to rotate the lever in a clockwise direction so that further downward movement permits this lever to be positioned generally laterally with respect to the shank 22 so shown in Fig. 4. If, at this point, the element 20 is not forced further downwardly into the sleeve 14 but instead the actuating mechanism, that has been attached to the upper end of the element for positioning it within the sleeve, is released, the spring 34 will move the element together with the shank 22 upward until the locking lever 24 engages and is parallel with the lower surface of the plate 16, bridging the opening 38 (Fig. 5) and accordingly preventing further upward movement of the element and shank, thus effectively coupling or latching the element to the frame 12. When it is desired to remove the element 20 from the frame the element is moved downward sufficiently to permit the locking lever 24 to rotate about its pivotal axis into engagement with the stop 28, this extreme position being shown in Fig. 6 as permitting free withdrawal of the shank 22 from the opening 18.

Normally the spring 26 will be sufficient to rotate the locking lever into engagement with the stop 28. However, in order to positively insure that the locking lever 24 will be rotated into engagement with the stop 28 to permit withdrawal of the shank 22 from the opening 18 and removal of the element 20 from the sleeve 14 even though the locking lever may become bound or frozen in the position shown in Fig. 5 because of corrosion or some other reason, an abutment 36 is positioned in the path of the locking lever so that, upon moving the shank 22 downward from the position shown in Fig. 5 to the position shown in Fig. 6, this abutment will engage the locking lever 24 and pivot it about its axis into engagement with the stop 28. The abutment 36 extends upwardly from a suitable support plate or framework 38 which forms the bottom of containment or frame member 12 and while a specific form of abutment is shown obviously any structural member which will effect the desired rotation of the locking lever may be employed to serve the purpose of this abutment.

Thus, with the coupling or latching mechanism of the present invention a member may be coupled to and uncoupled from another member solely by means of unidirectional relative movement between the members with the mechanism being simple in construction and yet positive and reliable in its operation.

While I have illustrated and described a preferred embodiment of my invention it is to be understood that such is merely illustrative and not restrictive and that variations and modifications may be made therein without departing from the function and scope of the invention. I therefore do not wish to be limited to the precise details set forth but desire to avail myself of such changes as fall within the purview of my invention.

What is claimed is:

1. A latching mechanism comprising an elongated shank, an elongated locking member pivoted to said shank about an axis normal to that of the shank, a stop on said shank limiting the rotational movement of the locking member, the locking member being substantially in alignment with the shank when in engagement with the stop, a retaining member slidably mounted on the shank for movement to and from a position where it is free of the locking member and where it is effective to prevent rotation of the locking member so as to retain the locking member in that rotative position substantially 180° from the position the locking member occupies when in engagement with the stop, spring means urging said locking member into engagement with said stop, a stationary member having an opening therein and into and through which said shank and locking member are adapted to be inserted; the retaining member engaging said stationary member upon insertion of the shank and locking member into said opening and, upon further insertion of the shank and locking member, moving relative thereto and to that position where it is free of the locking member, said locking member being of such length and being so pivoted to said shank as to extend across said opening and in overlying relation with the wall of the stationary member and generally normal to said shank, and means to urge said shank in a direction opposite to the direction in which it was inserted into the opening.

2. The organization of claim 1 including means, when said locking member is disposed in said overlying relation to the wall of the stationary member, positioned to engage the locking member upon insertion of the shank a predetermined distance through said opening to insure pivotal movement of the locking member into engagement with said stop.

3. In an organization of the type described the combination of a frame member having an opening therethrough, a shank adapted to be axially inserted through said opening, means for releasably retaining said shank within said opening including a locking lever pivoted to said shank and operative when in a first and second rotative position about its pivotal axis to permit free axial movement of the shank within said opening and when in a third rotative position intermediate said first and second position preventing such axial movement, stop means contacted by said locking lever when in said second position, means biasing said locking lever to said second position, means operative to releasably retain said locking lever in said first position, said last-named means releasing said locking lever in response to insertion of said shank within said opening, said locking lever moving to said third position upon insertion of said shank a predetermined distance within said opening and to said second position upon insertion of said shank a predetermined further distance, spring means opposing the insertion of said shank into said opening and biasing said shank for axial movement in a direction opposite to that in which it was inserted into said opening.

4. The organization defined in claim 3 including a member disposed in the path of said locking lever, when said shank moves said further predetermined distance, and operative to positively effect rotation of said lever to said second position.

5. The organization defined in claim 3 wherein the means to releasably retain the locking lever in its first position comprises a manually set keeper slidably mounted on said shank.

6. An automatic coupling comprising in combination a member having an opening therein and having an outwardly extending generally radial surface at one end of the opening, an elongated member adapted to be inserted into said opening through the other end thereof, a locking lever pivoted to said elongated member about an axis generally normal to that of said elongated member, means releasably retaining said lever in a position permitting insertion thereof through said opening, said means in response to insertion of said member and lever a predetermined distance into said opening being operative to release said lever for pivotal movement about its axis and upon further insertion into said opening said lever being pivotable to a locking position transversely of the opening and in overlying relation with said radial surface, and upon still further insertion into said opening being further pivotable in the same direction to a position permitting free withdrawal of said member from said opening, stop means defining this last named position and spring means urging said lever for pivotal movement into engagement with said stop means.

7. A device of the type described comprising a plate having a bore therethrough, an elongated member adapted to be inserted into and through said bore, a locking lever pivoted to said member and adapted to be inserted through said bore for locking behind the plate, spring means urging said lever for movement about its pivotal axis, means operative to releasably retain said lever in a given position against the bias of said spring so as to permit said member and lever to be inserted through said bore, said means being moved to a position free of the lever upon insertion of the latter through said bore, said lever being of such a length and pivoted to said member in such a manner as to be locked behind the plate upon insertion of said member a predetermined distance through the bore, the lever then being parallel with the plate and preventing withdrawal of said member from the bore, resilient means opposing the insertion of said member through said bore, and stop means limiting the pivotal movement of said lever to a position permitting withdrawal thereof from said bore, said stop means being engaged by said lever when said member is inserted a given distance beyond said predetermined distance.

References Cited in the file of this patent
UNITED STATES PATENTS 2,246,834    Bowman _____ June 24, 1941

FOREIGN PATENTS 500,632    Great Britain _____ Feb. 13, 1939